(12) United States Patent
Yang et al.

(10) Patent No.: US 11,368,704 B2
(45) Date of Patent: Jun. 21, 2022

(54) DEVICE AND METHOD FOR CODING VIDEO DATA

(71) Applicant: FG Innovation Company Limited, Tuen Mun (HK)

(72) Inventors: Yu-Chiao Yang, Taipei (TW); Chih-Yu Teng, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/223,331

(22) Filed: Apr. 6, 2021

(65) Prior Publication Data

US 2021/0314588 A1    Oct. 7, 2021

Related U.S. Application Data

(60) Provisional application No. 63/006,631, filed on Apr. 7, 2020.

(51) Int. Cl.
*H04N 19/44* (2014.01)
*H04N 19/176* (2014.01)
(Continued)

(52) U.S. Cl.
CPC .......... *H04N 19/44* (2014.11); *H04N 19/137* (2014.11); *H04N 19/176* (2014.11); *H04N 19/46* (2014.11)

(58) Field of Classification Search
CPC ....... H04N 19/46; H04N 19/70; H04N 19/513
See application file for complete search history.

(56) References Cited

U.S. PATENT DOCUMENTS

| 2017/0142418 A1 | 5/2017 | Li et al. |
| 2019/0342546 A1 | 11/2019 | Lin et al. |

(Continued)

FOREIGN PATENT DOCUMENTS

| CN | 105493505 A | 4/2016 |
| CN | 110868587 A | 3/2020 |

OTHER PUBLICATIONS

Olena Chubach et al., "CE4-related: On maximum number of subblock-based merging candidates", JVET-P0152-v1, Joint Video Experts Team (JVET) of ITU-T SG 16 WP 3 and ISO/IEC JTC 1/SC 29/WG 11, 16th Meeting: Geneva, CH, Oct. 1-11, 2019.

(Continued)

*Primary Examiner* — Kyle M Lotfi
(74) *Attorney, Agent, or Firm* — ScienBiziP, P.C.

(57) ABSTRACT

A method of decoding a bitstream by an electronic device is provided. The electronic device receives the bitstream and determines, from the bitstream, a prediction mode enabled flag and an affine enabled flag both corresponding to one or more image frames. The electronic device determines, from the bitstream, a maximum index corresponding to the one or more image frames when the affine enabled flag is true. An index value of the maximum index is in an index range determined based on the prediction mode enabled flag. The electronic device determines a maximum number of zero or more subblock-based merging motion vector prediction (MVP) candidates based on the maximum index when the affine enabled flag is true. The electronic device reconstructs the one or more image frames based on the maximum number of the zero or more subblock-based merging MVP candidates.

19 Claims, 6 Drawing Sheets

(51) Int. Cl.
*H04N 19/46* (2014.01)
*H04N 19/137* (2014.01)

(56) References Cited

U.S. PATENT DOCUMENTS

2019/0364295 A1    11/2019  Li et al.
2020/0404289 A1    12/2020  Li et al.
2021/0377561 A1*   12/2021  Zhang .................... H04N 19/51

OTHER PUBLICATIONS

Yu-Chiao Yang et al., "AHG9: On Maximum Number of Subblock Merge Candidates", JVET-R0373, Joint Video Experts Team (JVET) of ITU-T SG 16 WP 3 and ISO/IEC JTC 1/SC 29/WG 11, 18th Meeting: by teleconference, Apr. 15-24, 2020.

* cited by examiner

DEVICE AND METHOD FOR CODING VIDEO DATA

CROSS-REFERENCE TO RELATED APPLICATION(S)

The present disclosure claims the benefit of and priority to U.S. Provisional Patent Application Ser. No. 63/006,631, filed on Apr. 7, 2020, entitled "Maximum Number for Subblock Merge Candidate and Motion Storage for Geometric Partitioning Mode" (hereinafter referred to as "631 provisional"). The disclosure of '631 provisional is hereby incorporated fully by reference into the present disclosure.

FIELD

The present disclosure is generally related to video coding, and specifically, to techniques for using a high-level syntax to determine the number of the merging candidates.

BACKGROUND

In a conventional video coding method, an encoder may encode video data to generate encoded data having a plurality of flags and a plurality of indices and provide the encoded data to a decoder. The flags may indicate whether a plurality of coding modes is enabled. For example, the encoded data may include an affine enabled flag indicating whether an affine mode is enabled for some of the image frames. In addition, the indices may indicate maximum numbers of the mode candidates for the coding modes.

Although the encoded data can include a flag and an index for each of the coding modes in each of different level syntax elements, the coding efficiency may be decreased. Therefore, the encoder and the decoder need to have a method for more efficiently using the flags and the indices to limit a number of bits in the encoded date.

SUMMARY

The present disclosure is directed to a device and method for using a high-level syntax to determine the number of the merging candidates.

In a first aspect of the present disclosure, a method for decoding a bitstream and an electronic device for performing the method are provided. The method comprises receiving the bitstream; determining, from the bitstream, a prediction mode enabled flag and an affine enabled flag both corresponding to one or more image frames; determining, from the bitstream, a maximum index corresponding to the one or more image frames when the affine enabled flag is true, wherein an index value of the maximum index is in an index range determined based on the prediction mode enabled flag; determining a maximum number of zero or more subblock-based merging motion vector prediction (MVP) candidates based on the maximum index when the affine enabled flag is true; and reconstructing the one or more image frames based on the maximum number of the zero or more subblock-based merging MVP candidates.

In a second aspect of the present disclosure a method for decoding a bitstream and an electronic device for performing the method are provided. The method comprises receiving the bitstream; determining, from the bitstream, a prediction mode enabled flag corresponding to one or more image frames; determining, from the bitstream, a maximum index corresponding to the one or more image frames, wherein an index value of the maximum index is in an index range determined based on the prediction mode enabled flag; determining a maximum number of zero or more subblock-based merging motion vector prediction (MVP) candidates based on the maximum index; and reconstructing the one or more image frames based on the maximum number of the zero or more subblock-based merging MVP candidates.

BRIEF DESCRIPTION OF THE DRAWINGS

Aspects of the present disclosure are best understood from the following detailed disclosure and the corresponding figures. Various features are not drawn to scale and dimensions of various features may be arbitrarily increased or reduced for clarity of discussion.

DESCRIPTION

Figure 1:
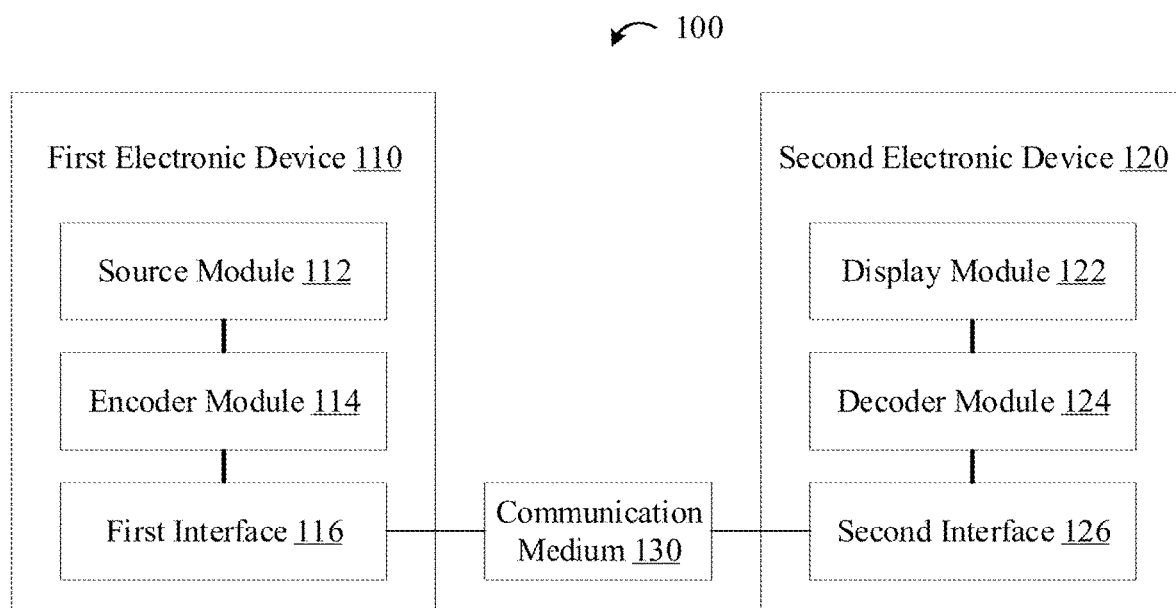
FIG. 1 illustrates a block diagram of a system configured to encode and decode video data according to an implementation of the present disclosure.

The following disclosure contains specific information pertaining to implementations in the present disclosure. The figures and the corresponding detailed disclosure are directed to example implementations. However, the present disclosure is not limited to these example implementations. Other variations and implementations of the present disclosure will occur to those skilled in the art.

Unless noted otherwise, like or corresponding elements among the figures may be indicated by like or corresponding reference designators. The figures and illustrations in the present disclosure are generally not to scale and are not intended to correspond to actual relative dimensions.

For the purpose of consistency and ease of understanding, like features are identified (although, in some examples, not illustrated) by reference designators in the exemplary figures. However, the features in different implementations may differ in other respects and shall not be narrowly confined to what is illustrated in the figures.

The disclosure uses the phrases "in one implementation," or "in some implementations," may refer to one or more of the same or different implementations. The term "coupled" is defined as connected, whether directly or indirectly, through intervening components and is not necessarily limited to physical connections. The term "comprising" means "including, but not necessarily limited to" and specifically indicates open-ended inclusion or membership in the so-described combination, group, series and the equivalent.

For purposes of explanation and non-limitation, specific details such as functional entities, techniques, protocols, and standards are set forth for providing an understanding of the disclosed technology. Detailed disclosure of well-known methods, technologies, systems and architectures are omitted so as not to obscure the present disclosure with unnecessary details.

Persons skilled in the art will recognize that any disclosed coding function(s) or algorithm(s) described in the present disclosure may be implemented by hardware, software or a combination of software and hardware. Disclosed functions may correspond to modules that are software, hardware, firmware, or any combination thereof.

A software implementation may include a program having computer executable instructions stored on computer readable medium such as memory or other type of storage devices. For example, one or more microprocessors or general-purpose computers with communication processing capability may be programmed with executable instructions and perform the disclosed function(s) or algorithm(s).

The microprocessors or general-purpose computers may be formed of applications specific integrated circuitry (ASIC), programmable logic arrays, and/or using one or more digital signal processors (DSPs). Although some of the disclosed implementations are oriented to software installed and executing on computer hardware, alternative implementations implemented as firmware or as hardware or combination of hardware and software are well within the scope of the present disclosure. The computer readable medium includes but is not limited to random-access memory (RAM), read-only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

FIG. 1 illustrates a block diagram of a system 100 configured to encode and decode video data according to an implementation of the present disclosure. The system 100 includes a first electronic device 110, a second electronic device 120, and a communication medium 130.

The first electronic device 110 may be a source device including any device configured to encode video data and transmit encoded video data to the communication medium 130. The second electronic device 120 may be a destination device including any device configured to receive encoded video data via the communication medium 130 and to decode encoded video data.

The first electronic device 110 may communicate via wire or wirelessly with the second electronic device 120 via the communication medium 130. The first electronic device 110 may include a source module 112, an encoder module 114, and a first interface 116. The second electronic device 120 may include a display module 122, a decoder module 124, and a second interface 126. The first electronic device 110 may be a video encoder and the second electronic device 120 may be a video decoder.

The first electronic device 110 and/or the second electronic device 120 may be a mobile phone, a tablet, a desktop, a notebook, or other electronic devices. FIG. 1 illustrates one example of the first electronic device 110 and the second electronic device 120. The first electronic device 110 and second electronic device 120 may include more or less components than illustrated or have a different configuration of the various illustrated components.

The source module 112 may include a video capture device to capture new video, a video archive to store previously captured video, and/or a video feed interface to receive video from a video content provider. The source module 112 may generate computer graphics-based data as the source video or generate a combination of live video, archived video, and computer-generated video as the source video. The video capture device may be a charge-coupled device (CCD) image sensor, a complementary metal-oxide-semiconductor (CMOS) image sensor, or a camera.

The encoder module 114 and the decoder module 124 may each be implemented as any of a variety of suitable encoder/decoder circuitry such as one or more microprocessors, a central processing unit (CPU), a graphic processing unit (GPU), a system on chip (SoC), digital signal processors (DSPs), application specific integrated circuits (ASICs), field programmable gate arrays (FPGAs), discrete logic, software, hardware, firmware or any combinations thereof. When implemented partially in software, a device may store the program having instructions for the software in a suitable, non-transitory computer-readable medium and execute the instructions in hardware using one or more processors to perform the disclosed methods. Each of the encoder module 114 and the decoder module 124 may be included in one or more encoders or decoders, any of which may be integrated as part of a combined encoder/decoder (CODEC) in a device.

The first interface 116 and the second interface 126 may utilize customized protocols or follow existing standards or de facto standards including, but not limited to, Ethernet, IEEE 802.11 or IEEE 802.15 series, Wireless USB or telecommunication standards including, but not limited to, Global System for Mobile Communications (GSM), Code-Division Multiple Access 2000 (CDMA2000), Time Division Synchronous Code Division Multiple Access (TD-SCDMA), Worldwide Interoperability for Microwave Access (WiMAX), Third Generation Partnership Project Long-Term Evolution (3GPP-LTE) or Time-Division LTE (TD-LTE). The first interface 116 and the second interface 126 may each include any device configured to transmit and/or store a compliant video bitstream via the communication medium 130 and to receive the compliant video bitstream via the communication medium 130.

The first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, I2C, or any other logical and physical structure that may be used to interconnect peer devices.

The display module 122 may include a display using liquid crystal display (LCD) technology, plasma display technology, organic light emitting diode (OLED) display technology, or light emitting polymer display (LPD) technology with other display technologies used in other implementations. The display module 122 may include a high-definition display or an ultra-high-definition display.

Figure 2:
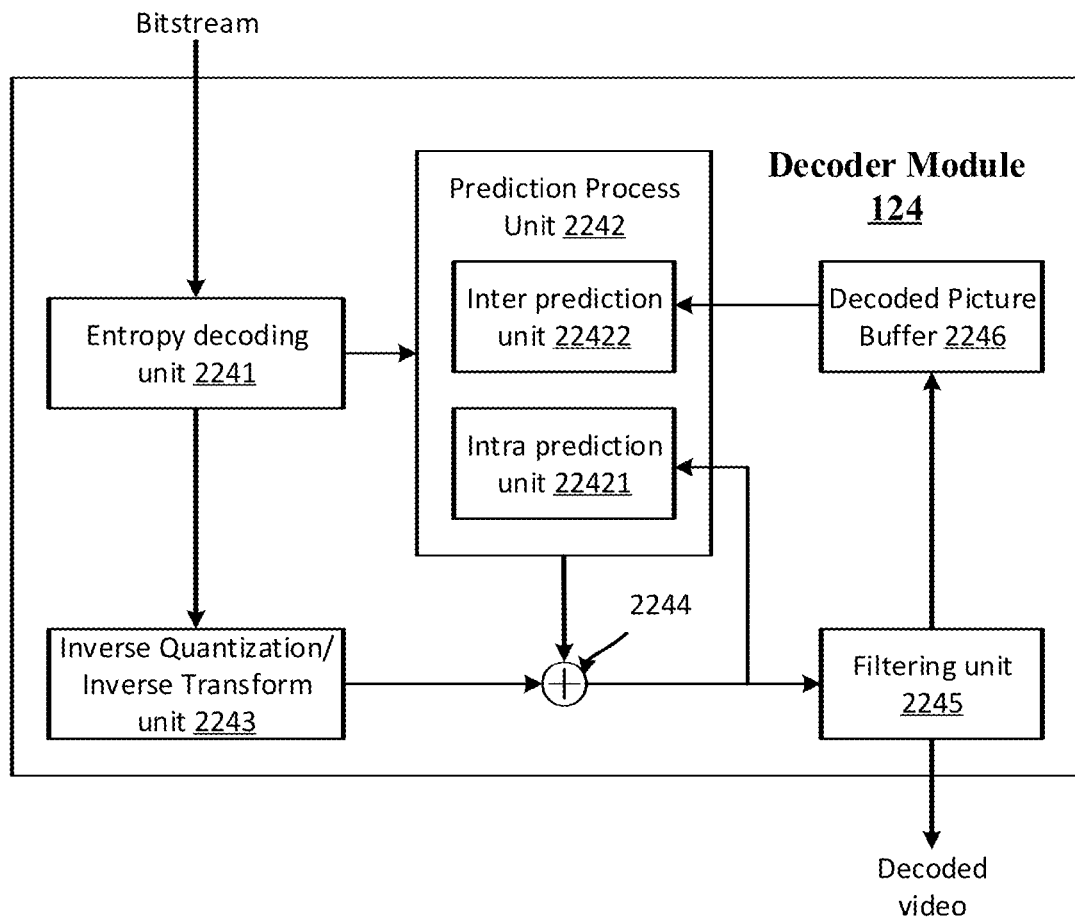
FIG. 2 illustrates a block diagram of the decoder module of the second electronic device illustrated in FIG. 1 according to an implementation of the present disclosure.

FIG. 2 illustrates a block diagram of the decoder module 124 of the second electronic device 120 illustrated in FIG. 1 according to an implementation of the present disclosure. The decoder module 124 includes an entropy decoder (e.g., entropy decoding unit 2241), a prediction processor (e.g., prediction process unit 2242), an inverse quantization/inverse transform processor (e.g., inverse quantization/inverse transform unit 2243), a summer (e.g., summer 2244), a filter (e.g., filtering unit 2245), and a decoded picture buffer (e.g., decoded picture buffer 2246). The prediction process unit 2242 further includes an intra prediction processor (e.g., intra prediction unit 22421) and an inter prediction processor (e.g., inter prediction unit 22422). The decoder module 124 receives a bitstream and decodes the bitstream to output decoded video.

The entropy decoding unit 2241 may receive the bitstream including a plurality of syntax elements from the second interface 126 in FIG. 1 and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and other syntax information.

The entropy decoding unit 2241 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique to generate the quantized transform coefficients. The entropy decoding unit 2241 may provide the quantized transform coefficients, the quantization parameters, and the transform data to the inverse quantization/inverse transform unit 2243 and provide the motion vectors, the intra modes, the partition information, and other syntax information to the prediction process unit 2242.

The prediction process unit 2242 may receive syntax elements such as motion vectors, intra modes, partition information, and other syntax information from the entropy decoding unit 2241. The prediction process unit 2242 may receive the syntax elements including the partition information and divide image frames according to the partition information.

Each of the image frames may be divided into at least one image block according to the partition information. The at least one image block may include a luminance block for reconstructing a plurality of luminance samples and at least one chrominance block for reconstructing a plurality of chrominance samples. The luminance block and the at least one chrominance block may be further divided to generate macroblocks, coding tree units (CTUs), coding blocks (CBs), sub-divisions thereof, and/or another equivalent coding unit.

During the decoding process, the prediction process unit 2242 may receive predicted data including the intra mode or the motion vector for a current image block of a specific one of the image frames. The current image block may be the luminance block or one of the chrominance blocks in the specific image frame.

The intra prediction unit 22421 may perform intra-predictive coding of a current block unit relative to one or more neighboring blocks in the same frame as the current block unit based on syntax elements related to the intra mode in order to generate a predicted block. The intra mode may specify the location of reference samples selected from the neighboring blocks within the current frame. The intra prediction unit 22421 may reconstruct a plurality of chroma components of the current block unit based on a plurality of luma components of the current block unit when the chroma components are reconstructed by the prediction process unit 2242.

The intra prediction unit 22421 may reconstruct a plurality of chroma components of the current block unit based on the plurality of luma components of the current block unit when the luma components of the current block unit are reconstructed by the prediction process unit 2242.

The inter prediction unit 22422 may perform inter-predictive coding of the current block unit relative to one or more blocks in one or more reference image blocks based on syntax elements related to the motion vector in order to generate the predicted block. The motion vector may indicate a displacement of the current block unit within the current image block relative to a reference block unit within the reference image block. The reference block unit is a block determined to closely match the current block unit. The inter prediction unit 22422 may receive the reference image block stored in the decoded picture buffer 2246 and reconstruct the current block unit based on the received reference image blocks.

The inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

The inverse transformation may be inversely applied by the transformation process such as discrete cosine transform (DCT), discrete sine transform (DST), adaptive multiple transform (AMT), mode-dependent non-separable secondary transform (MDNSST), hypercube-givens transform (HyGT), signal dependent transform, Karhunen-Loéve transform (KLT), wavelet transform, integer transform, sub-band transform or a conceptually similar transform. The inverse transformation may convert the residual information from a transform domain, such as a frequency domain, back to the pixel domain. The degree of inverse quantization may be modified by adjusting a quantization parameter.

The summer 2244 adds the reconstructed residual block to the predicted block provided from the prediction process unit 2242 to produce a reconstructed block.

The filtering unit 2245 may include a deblocking filter, a sample adaptive offset (SAO) filter, a bilateral filter, and/or an adaptive loop filter (ALF) to remove blocking artifacts from the reconstructed block. Additional filters (in loop or post loop) may also be used in addition to the deblocking filter, the SAO filter, the bilateral filter and the ALF. Such filters are not explicitly illustrated for brevity but may filter the output of the summer 2244. The filtering unit 2245 may output the decoded video to the display module 122 or other video receiving unit after the filtering unit 2245 performs the filtering process for the reconstructed blocks of the specific image frame.

The decoded picture buffer 2246 may be a reference picture memory that stores the reference block for use by the prediction process unit 2242 in decoding the bitstream (in inter coding modes). The decoded picture buffer 2246 may be formed by any of a variety of memory devices such as dynamic random-access memory (DRAM), including synchronous DRAM (SDRAM), magneto-resistive RAM (MRAM), resistive RAM (RRAM), or other types of memory devices. The decoded picture buffer 2246 may be on-chip with other components of the decoder module 124 or off-chip relative to those components.

Figure 3:
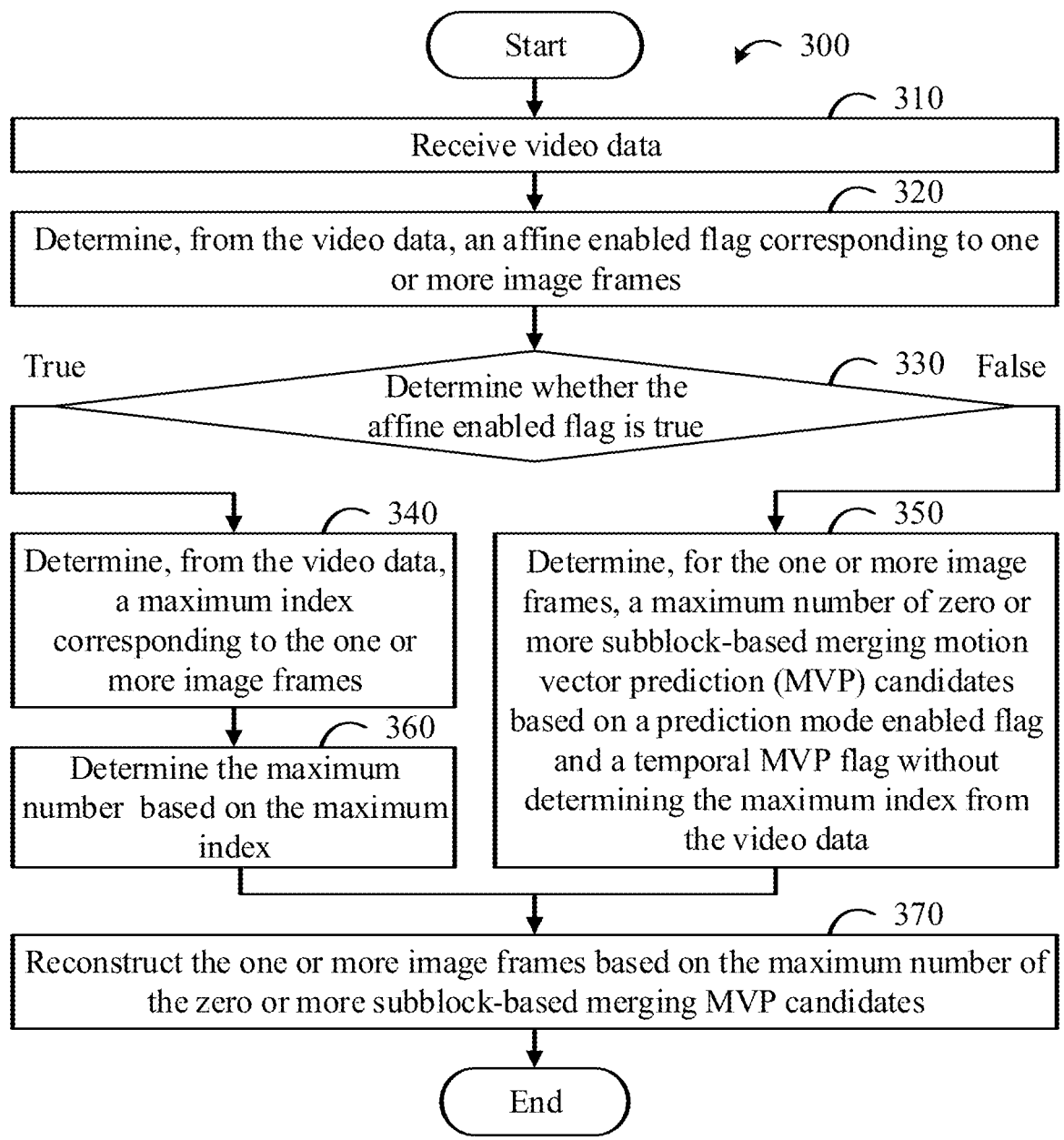
FIG. 3 illustrates a flowchart of a method for decoding video data by an electronic device according to an implementation of the present disclosure.

FIG. 3 illustrates a flowchart of a method 300 for decoding video data by an electronic device according to an implementation of the present disclosure. The method 300 is an example only as there are a variety of ways to perform decoding of the video data.

The method 300 may be performed using the configurations illustrated in FIG. 1 and FIG. 2 and various elements of these figures are referenced with regard to the method 300. Each block illustrated in FIG. 3 may represent one or more processes, methods, or subroutines performed.

The order of blocks in FIG. 3 is illustrative only and may change. Additional blocks may be added or less blocks may be utilized without departing from the present disclosure.

At block 310, the decoder module 124 receives video data. The video data may be a bitstream.

With reference to FIG. 1 and FIG. 2, the second electronic device 120 may receive the bitstream from an encoder, such as the first electronic device 110, or other video providers via the second interface 126. The second interface 126 may provide the bitstream to the decoder module 124.

The entropy decoding unit 2241 may decode the bitstream to determine a plurality of prediction indications and a plurality of partitioning indications for a plurality of video images. Then, the decoder module 124 may further reconstruct the plurality of video images based on the prediction indications and the partitioning indications. The prediction indications and the partitioning indications may include a plurality of flags and a plurality of indices.

At block 320, the decoder module 124 determines, from the video data, an affine enabled flag corresponding to one or more image frames. With further reference to FIG. 1 and FIG. 2, the decoder module 124 may determine the one or more image frames from the bitstream and determine a first parameter set corresponding to the one or more image frames.

The first parameter set may include a plurality of first prediction indications and a plurality of first partitioning indications. The first parameter set may be one of a video parameter set (VPS), a sequence parameter set (SPS), a picture parameter set (PPS), and a picture header (PH). For example, the affine enabled flag may be a flag sps_affine_enabled_flag when the affine enabled flag is included in the SPS. Each of the one or more image frames is reconstructed based on the SPS when the first parameter set is SPS.

The decoder module 124 may determine, from the first parameter set of the bitstream, the affine enabled flag corresponding to the one or more image frames. The affine enabled flag is used to determine whether an affine model-based motion compensation is enabled for the one or more image frames.

A block-based syntax in the bitstream may further include a block-based affine flag for determining whether the affine model-based motion compensation is used for an image block divided from one of the one or more image frames when the affine enabled flag is equal to one. The affine model-based motion compensation may include affine merge prediction (having a plurality of affine merge candidates selected from a plurality of inherited affine merge candidates, a plurality of constructed affine merge candidates and at least one zero motion vectors (MVs) candidate), and affine advanced motion vector prediction (AMVP) prediction (having a plurality of affine AMVP candidates selected from a plurality of inherited affine AMVP candidates, a plurality of constructed affine AMVP candidates, a translational MVs candidate determined from neighboring blocks and at least one zero MVs candidate). In the affine merge prediction, a merge index may be included in the bitstream for selecting a prediction candidate from a merge list to generate a prediction result. In addition, in the affine AMVP prediction, at least two of control point motion vector predictors may be used to generate the prediction result.

The decoder module 124 may further determine, from the first parameter set of the bitstream, a prediction mode enabled flag corresponding to the one or more image frames. Both the prediction mode enabled flag and the affine enabled flag corresponds to the one or more image frames. The prediction mode enabled flag may be included in one of the VPS, SPS, PPS and the PH. When the affine enabled flag is included in the SPS, the prediction mode enabled flag is also included in the SPS. The prediction mode enabled flag corresponding to a specific one of a plurality of prediction modes may be used to determine whether the specific prediction mode is enabled for the one or more image frames.

The specific prediction mode may be a subblock-based temporal motion vector prediction (MVP) (sbTMVP) mode. Therefore, the prediction mode enabled flag may be an sbTMVP enabled flag. The sbTMVP enabled flag may be used to determine whether a subblock-based temporal MVP mode having a plurality of subblock-based temporal motion vector predictors is enabled in the one or more image frames. The sbTMVP enabled flag may be a flag sps_sbtmvp_enabled_flag included in the SPS when the affine enabled flag is included in the SPS.

At block 330, the decoder module 124 determines whether the affine enabled flag is true. The method 300 may proceed to block 340 when the decoder module 124 determines that the affine enabled flag is true. The method 300 may proceed to block 350 when the decoder module 124 determines the affine enabled flag is false.

The decoder module 124 determines that the affine enabled flag is true when the affine enabled flag is equal to one. The decoder module 124 determines that the affine enabled flag is false when the affine enabled flag is equal to zero.

The affine enabled flag is a flag vps_affine_enabled_flag when the affine enabled flag is included in VPS. The affine enabled flag is a flag sps_affine_enabled_flag when the affine enabled flag is included in an SPS. The affine enabled flag is a flag pps_affine_enabled_flag when the affine enabled flag is included in a PPS. The affine enabled flag is a flag ph_affine_enabled_flag when the affine enabled flag is included in a PH.

At block 340, the decoder module 124 determines, from the video data, a maximum index corresponding to the one or more image frames. With further reference to FIG. 1 and FIG. 2, the decoder module 124 may determine the maximum index from the first parameter set corresponding to the one or more image frames when the affine enabled flag is true. Therefore, the maximum index also corresponds to the one or more image frames. The maximum index is included in the SPS when the affine enabled flag is included in the SPS.

The maximum index is used to calculate a maximum number of zero or more subblock-based merging MVP candidates when the affine enabled flag is true. The maximum number may be represented as MaxNumSubblockMergeCand. The maximum index is an index sps_N_minus_max_num_subblock_merge_cand when the maximum index is included in the SPS. The number N is a first integer. The maximum index is an index sps_five_minus_max_num_subblock_merge_cand when the maximum index is included in the SPS and the number N is equal to 5. When the maximum index is included in the PPS and the number N is equal to 6, the maximum index is an index pps_six_minus_max_num_subblock_merge_cand.

An index value of the maximum index may be in an index range. The index range may be predefined from P to N−K1. The number P is a second integer less than the number N, and the number K1 is a third integer less than the number N. The numbers P and K1 may be predefined in the first electronic device 110 and the second electronic device 120. When the maximum index is an index sps_five_minus_ max_num_subblock_merge_cand, the index range may be predefined from P to 5−K1. Therefore, the index range may be predefined from 0 to 5 when the numbers P and K1 are equal to zero. In addition, the index range may be predefined from 0 to 4 when the number P is equal to zero and the number K1 is equal to one.

The index range may be predefined from P to N−K2. A value of the variable K2 is equal to a fourth integer less than the number N. The number P may be predefined in the first electronic device 110 and the second electronic device 120, and the value of the variable K2 may be determined from the bitstream. When the maximum index is an index sps_five_minus_max_num_subblock_merge_cand, the index range may be predefined from P to 5−K2. Therefore, the index range may be predefined from 0 to 5−K2 when the numbers P is equal to zero.

The variable K2 may be determined by a flag included in the first parameter set of the bitstream. Therefore, the flag for determining the variable K2 is also included in the SPS when the affine enabled flag and the maximum index are included in the SPS. The flag for determining the variable K2 may be the prediction mode enabled flag. Therefore, the index range may be determined based on the prediction mode enabled flag.

For example, when the number P is equal to zero and the variable K2 is equal to a flag value of the prediction mode enabled flag, the index value of the maximum index is in the index range of 0 to N−K2. The index value of the maximum index is in the index range of 0 to N−1 when the prediction mode enabled flag is equal to one. The index value of the maximum index is in the index range of 0 to N when the prediction mode enabled flag is equal to zero. The number N may be equal to five.

The prediction mode enabled flag may be the sbTMVP enabled flag included in the SPS. Therefore, the index range of the index sps_five_minus_max_num_subblock_merge_cand may be predefined from 0 to 4 when the number P is equal to zero and the sbTMVP enabled flag is equal to one. In addition, the index range of the index sps_five_minus_max_num_subblock_merge_cand may be predefined from 0 to 5 when the number P is equal to zero and the sbTMVP enabled flag is equal to zero.

At block 350, the decoder module 124 determines, for the one or more image frames, the maximum number of the zero or more subblock-based merging MVP candidates based on the prediction mode enabled flag and a temporal MVP (TMVP) flag without determining the maximum index from the video data.

The maximum number is calculated based on the prediction mode enabled flag and the TMVP flag without determining the maximum index from the video data when the affine enabled flag is false. The prediction mode enabled flag may be the sbTMVP enabled flag sps_sbtmvp_enabled_flag included in the SPS when the affine enabled flag is included in the SPS.

The TMVP flag may be determined from another level parameter set. For example, the TMVP flag may be a flag ph_temporal_mvp_enabled_flag when the TMVP flag is included in the picture header corresponding to at least one of the one or more image frames. Therefore, the TMVP flag may correspond to the at least one of the one or more image frames. The at least one of the one or more image frames is reconstructed based on the picture header corresponding to the at least one of the one or more image frames.

The maximum index may not be parsed from the video data when the affine enabled flag is false. However, the maximum index may be inferred to be equal to M when the affine enabled flag is false. The number M is a predefined integer in the first electronic device 110 and the second electronic device 120. For example, the maximum index may be inferred to be equal to 0 when the affine enabled flag is false. In addition, the maximum index may be inferred to be equal to 5 when the affine enabled flag is false.

The prediction mode enabled flag may be equal to one or zero, and the TMVP flag may be equal to one or zero. The maximum number MaxNumSubblockMergeCand may be equal to (the prediction mode enabled flag && the TMVP flag) when the affine enabled flag is false.

The logical operator "&&" is a Boolean logical "and" of two values. Therefore, the maximum number MaxNumSubblockMergeCand may be equal to one when the affine enabled flag is false and each of the prediction mode enabled flag and the TMVP flag is equal to one. In other words, the maximum number MaxNumSubblockMergeCand may be equal to zero when the affine enabled flag is false and at least one of the prediction mode enabled flag and the TMVP flag is equal to zero.

Therefore, when the affine enabled flag is false and the prediction mode enabled flag is the sbTMVP enabled flag, the maximum number MaxNumSubblockMergeCand may be derived as follows:

MaxNumSubblockMergeCand=sps_sbtmvp_enabled_flag && ph_temporal_mvp_enable_flag

At block 360, the decoder module 124 determines the maximum number based on the maximum index. The decoder module 124 may determine, for the one or more image frames, the maximum number of the zero or more subblock-based merging MVP candidates when the prediction mode enabled flag is true.

The maximum number may be determined by subtracting the maximum index from the number N, when the affine enabled flag is true. Therefore, the maximum number may be calculated by subtracting the maximum index from five, when the affine enabled flag is true and the number N is equal to 5. In other words, when the affine enabled flag is true and the number N is equal to 5, the maximum number MaxNumSubblockMergeCand may be derived as follows:

MaxNumSubblockMergeCand=5−sps_five_minus_max_num_subblock_merge_cand

The index value of the maximum index may be in the index range of P to N−K1 and the maximum number may be calculated by subtracting the maximum index from the number N, when the affine enabled flag is true. Therefore, a value of the maximum number may be in a value range of N−(N−K1) to N−P (i.e., the value range of K1 to N−P). When the maximum index is the index sps_five_minus_max_num_subblock_merge_cand, the index range may be predefined from P to 5−K1 and the value range may be predefined from K1 to 5−P.

Therefore, both the index range and the value range may be predefined from 0 to 5 when the numbers P and K1 are equal to zero. In addition, the index range may be predefined from 0 to 4 and the value range may be predefined from 1 to 5 when the number P is equal to zero and the number K1 is equal to one.

The index value of the maximum index may be in the index range of P to N−K2 and the maximum number may be calculated by subtracting the maximum index from the number N, when the affine enabled flag is true. Therefore, the value of the maximum number is in the value range of N−(N−K2) to N−P (i.e., the value range of K2 to N−P). When the number P is equal to zero and the variable K2 is equal to the flag value of the prediction mode enabled flag, the index range may be predefined from 0 to N—the flag value of the prediction mode enabled flag and the value range may be predefined from the flag value of the prediction mode enabled flag to N.

Therefore, the index value of the maximum index sps_five_minus_max_num_subblock_merge_cand may be in the index range of 0 to 5—the value of the flag sps_sbtmvp_enabled_flag and the maximum number MaxNumSubblockMergeCand may be in the value range of the value of the flag sps_sbtmvp_enabled_flag to 5 when the number N is equal to five and the prediction mode enabled flag is the flag sps_sbtmvp_enabled_flag.

Therefore, both the index range and the value range may be predefined from 0 to 5 when the number P and the flag sps_sbtmvp_enabled_flag are equal to zero. In addition, the index range may be predefined from 0 to 4 and the value range may be predefined from 1 to 5 when the number P is equal to zero and the flag sps_sbtmvp_enabled_flag is equal to one.

With reference to blocks 330-360 in FIG. 3, the maximum number MaxNumSubblockMergeCand may be derived as follows:

```
if( sps_affine_enabled_flag)
   MaxNumSubblockMergeCand = 5 - sps_five_minus_max_
   num_subblock_merge_cand
else
   MaxNumSubblockMergeCand
   = sps_sbtmvp_enabled_flag && ph_temporal_mvp_enabled_flag
```

The decoder module 124 may determine whether the maximum number is included in the value range. The decoder module 124 may determine that the video data is not in compliance with the decoder module 124 when the decoder module 124 determines that the maximum number is excluded from the value range.

Therefore, the decoder module 124 may output an error signal for the one or more image frames. In other words, the decoder module 124 may determine that the video data is in compliance with the decoder module 124 when the decoder module 124 determines that the maximum number is included in the value range. Therefore, the decoder module 124 may decode the bitstream to reconstruct the one or more image frames.

The decoder module 124 may determine whether the maximum index is included in the index range when the affine enabled flag is true. The decoder module 124 may determine that the video data is not in compliance with the decoder module 124 when the decoder module 124 determines that the maximum index is excluded from the index range. Therefore, the decoder module 124 may output an error signal for the one or more image frames.

The above determination may be one of the bitstream conformance requirements in a video coding standard, such as versatile video coding (VVC). In other words, the decoder module 124 may determine that the video data is in compliance with the decoder module 124 when the decoder module 124 determines that the maximum index is included in the index range. Therefore, the decoder module 124 may decode the bitstream to reconstruct the one or more image frames.

At block 370, the decoder module 124 reconstructs the one or more image frames based on the maximum number of the zero or more subblock-based merging MVP candidates. With further reference to FIG. 1 and FIG. 2, the decoder module 124 may select a prediction mode for each of a plurality of image blocks in the one or more image frames from a plurality of mode candidates including the zero or more subblock-based merging MVP candidates and determine a plurality of predicted blocks based on the prediction modes.

The number of the zero or more subblock-based merging MVP candidates for each image block in the one or more image frames is restricted by the maximum number. Therefore, the decoder module 124 reconstructs the one or more image frames based on the zero or more subblock-based merging MVP candidates restricted by the maximum number.

The zero or more subblock-based merging MVP candidates may include zero or more of a plurality of sbTMVP candidates, a plurality of affine merge prediction candidates and at least one zero-padding candidate. The decoder module 124 may determine a plurality of residual components from the bitstream for each of the image blocks and add the residual components into a corresponding one of the predicted blocks to reconstruct the image blocks. The decoder module 222 may reconstruct all of the image frames for reconstructing the video images.

In a video coding standard, such as high efficiency video coding (HEVC) and VVC, a plurality of first search candidates of the subblock-based merging mode including the subblock-based merging MVP candidates may be more efficient than a plurality of second search candidates of the affine AMVP prediction. However, the number of the first search candidates of the subblock-based merging mode may be restricted by the maximum number MaxNumSubblockMergeCand. Therefore, due to an encoder complexity, the maximum number MaxNumSubblockMergeCand may be set to ensure that the subblock-based merging mode may not be disabled by the maximum number when the affine model-based motion compensation is enabled. Therefore, the number K1 may be set to be greater than zero so the maximum number MaxNumSubblockMergeCand will also be greater than zero.

In addition, the value of the variable K2 is determined to be greater than zero and the maximum number MaxNumSubblockMergeCand is also greater than zero when the sbTMVP enabled flag is equal to one. There will be no condition that the maximum number is equal to zero to disable the subblock-based merging mode and thus the signaling of the maximum index will not be useless and wasted.

In order to decrease complexity, the subblock-based merging mode may be used when affine enabled flag is true. The value of the variable K2 determined from the sbTMVP enabled flag may be equal to one for changing the value range of the maximum number MaxNumSubblockMergeCand when the affine enabled flag is true. However, it is unnecessary to reserve a candidate for the subblock-based merging MVP candidates when the subblock-based merging mode has been already disabled. Therefore, the value of the variable K2 determined from the sbTMVP enabled flag may be equal to zero to maintain the value range unchanged when the subblock-based merging mode is disabled.

Figure 4:
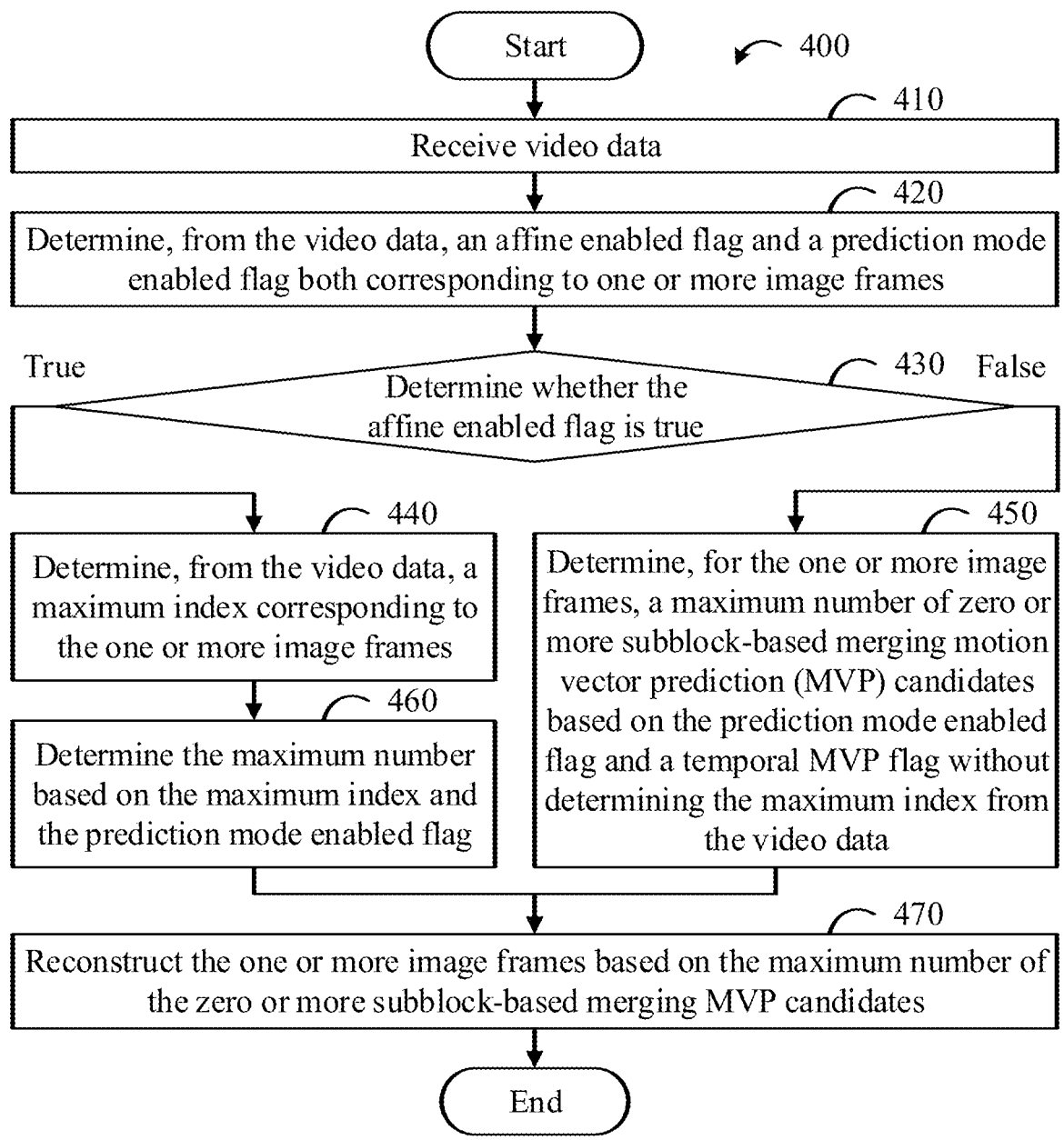
FIG. 4 illustrates a flowchart of a method for decoding video data by an electronic device according to an implementation of the present disclosure.

FIG. 4 illustrates a flowchart of a method 400 for decoding video data by an electronic device according to an implementation of the present disclosure. The method 400 is an example only as there are a variety of ways to perform decoding of the video data.

The method 400 may be performed using the configurations illustrated in FIG. 1 and FIG. 2 and various elements of these figures are referenced with regard to the method

400. Each block illustrated in FIG. 4 may represent one or more processes, methods, or subroutines performed.

The order of blocks in FIG. 4 is illustrative only and may change. Additional blocks may be added or less blocks may be utilized without departing from the present disclosure.

At block 410, the decoder module 124 receives video data. The video data may be a bitstream.

With reference to FIG. 1 and FIG. 2, the second electronic device 120 may receive the bitstream from an encoder, such as the first electronic device 110, or other video providers via the second interface 126. The second interface 126 may provide the bitstream to the decoder module 124.

The entropy decoding unit 2241 may decode the bitstream to determine a plurality of prediction indications and a plurality of partitioning indications for a plurality of video images. Then, the decoder module 124 may further reconstruct the plurality of video images based on the prediction indications and the partitioning indications. The prediction indications and the partitioning indications may include a plurality of flags and a plurality of indices.

At block 420, the decoder module 124 determines, from the video data, an affine enabled flag and a prediction mode enabled flag both corresponding to one or more image frames from the video data. With further reference to FIG. 1 and FIG. 2, the decoder module 124 may determine the one or more image frames from the bitstream and determine a first parameter set corresponding to the one or more image frames.

The first parameter set may include a plurality of first prediction indications and a plurality of first partitioning indications. The first parameter set may be one of a video parameter set (VPS), a sequence parameter set (SPS), a picture parameter set (PPS), and a picture header (PH). For example, the affine enabled flag may be a flag sps_affine_enabled_flag when the affine enabled flag is included in the SPS. Each of the one or more image frames is reconstructed based on the SPS when the first parameter set is SPS.

The decoder module 124 may determine the affine enabled flag corresponding to the one or more image frames from the first parameter set of the bitstream. The affine enabled flag is used to determine whether an affine model-based motion compensation is enabled for the one or more image frames.

The decoder module 124 may further determine the prediction mode enabled flag corresponding to the one or more image frames from the first parameter set of the bitstream. The prediction mode enabled flag corresponding to a specific one of a plurality of prediction modes may be used to determine whether the specific prediction mode are enabled for the one or more image frames. The specific prediction mode may be a subblock-based temporal motion vector prediction (MVP) (sbTMVP) mode.

Therefore, the prediction mode enabled flag may be an sbTMVP enabled flag. The sbTMVP enabled flag may be used to determine whether the sbTMVP mode having a plurality of subblock-based temporal motion vector predictors is enabled in the one or more image frames. The sbTMVP enabled flag may be a flag sps_sbtmvp_enabled_flag included in the SPS when the affine enabled flag is included in the SPS.

At block 430, the decoder module 124 determines whether the affine enabled flag is true. The method 400 may proceed to block 440 when the decoder module 124 determines that the affine enabled flag is true. The method 400 may proceed to block 450 when the decoder module 124 determines the affine enabled flag is false.

The decoder module 124 determines that the affine enabled flag is true when the affine enabled flag is equal to one. The decoder module 124 determines that the affine enabled flag is false when the affine enabled flag is equal to zero.

The affine enabled flag is a flag vps_affine_enabled_flag when the affine enabled flag is included in VPS. The affine enabled flag is a flag sps_affine_enabled_flag when the affine enabled flag is included in an SPS. The affine enabled flag is a flag pps_affine_enabled_flag when the affine enabled flag is included in a PPS. The affine enabled flag is a flag ph_affine_enabled_flag when the affine enabled flag is included in a PH.

At block 440, the decoder module 124 determines, from the video data, a maximum index corresponding to the one or more image frames. With further reference to FIG. 1 and FIG. 2, the decoder module 124 may determine the maximum index from the first parameter set corresponding to the one or more image frames when the affine enabled flag is true. Therefore, the maximum index also corresponds to the one or more image frames. The maximum index is included in the SPS when the affine enabled flag is included in the SPS.

The maximum index is used to calculate a maximum number of zero or more subblock-based merging MVP candidates when the affine enabled flag is true. The maximum number may be represented as MaxNumSubblockMergeCand. The maximum index is an index sps_N_minus_max_num_subblock_merge_cand when the maximum index is included in the SPS. The number N is an integer.

The maximum index is an index sps_five_minus_max_num_subblock_merge_cand when the maximum index is included in the SPS and the number N is equal to 5. When the maximum index is included in the PPS and the number N is equal to 6, the maximum index is an index pps_six_minus_max_num_subblock_merge_cand.

An index value of the maximum index may be in an index range. The index range may be predefined from 0 to N. When the maximum index is an index sps_five_minus_max_num_subblock_merge_cand, the index range may be predefined from 0 to 5.

At block 450, the decoder module 124 determines, for the one or more image frames, the maximum number of the zero or more subblock-based merging MVP candidates based on the prediction mode enabled flag and a temporal MVP (TMVP) flag without determining the maximum index from the video data.

The maximum number is calculated based on the prediction mode enabled flag and the TMVP flag without determining maximum index from the video data when the affine enabled flag is false. The prediction mode enabled flag may be the sbTMVP enabled flag. Therefore, the prediction mode enabled flag may be a flag sps_sbtmvp_enabled_flag included in the SPS when the affine enabled is included in the SPS. The TMVP flag may be determined from another level parameter set.

For example, the TMVP flag may be a flag ph_temporal_mvp_enabled_flag when the TMVP flag is included in the picture header corresponding to at least one of the one or more image frames. Therefore, the TMVP flag may correspond to the at least one of the one or more image frames. The at least one of the one or more image frames is reconstructed based on the picture header corresponding to the at least one of the one or more image frames.

The maximum index may not be parsed from the video data when the affine enabled flag is false. However, the maximum index may be inferred to be equal to M when the affine enabled flag is false. The number M is a predefined integer in the first electronic device 110 and the second electronic device 120.

For example, the maximum index may be inferred to be equal to 0 when the affine enabled flag is false. In addition, the maximum index may be inferred to be equal to 5 when the affine enabled flag is false.

The prediction mode enabled flag may be equal to one or zero, and the TMVP flag may be equal to one or zero. The maximum number MaxNumSubblockMergeCand may be equal to (the prediction mode enabled flag && the TMVP flag) when the affine enabled flag is false. The logical operator "&&" is a Boolean logical "and" of two values.

Therefore, the maximum number MaxNumSubblockMergeCand may be equal to one when the affine enabled flag is false and each of the prediction mode enabled flag and the TMVP flag is equal to one. In other words, the maximum number MaxNumSubblockMergeCand may be equal to zero when the affine enabled flag is false and at least one of the prediction mode enabled flag and the TMVP flag is equal to zero.

Therefore, when the affine enabled flag is false and the prediction mode enabled flag is the sbTMVP enabled flag, the maximum number MaxNumSubblockMergeCand may be derived as follows:

MaxNumSubblockMergeCand=sps_sbtmvp_enabled_flag
        && ph_temporal_mvp_enable_flag At block 460, the decoder module 124 determines the maximum number based on the maximum index and the prediction mode enabled flag. When the affine enabled flag is true, there may be more than one equation used for deriving the maximum number. The decoder module 124 may select one of the more than one equation based on the maximum index and the prediction mode enabled flag.

For example, when the maximum index is equal to N and the prediction mode enabled flag is true, a first equation may be selected to determine that the maximum number is equal to a flag value of the TMVP flag. In addition, when the maximum index is different from N or the prediction mode enabled flag is false, a second equation may be selected to determine that the maximum number is calculated by subtracting the maximum index from the number N. In other words, the maximum number MaxNumSubblockMergeCand may be derived as follows:

MaxNumSubblockMergeCand=(maximum
        index==N&& prediction mode enabled flag)
        ?TMVP flag:N−maximum index For example, the maximum index is the index sps_five_minus_max_num_subblock_merge_cand when the number N is equal to five, the prediction mode enabled flag is the flag sps_sbtmvp_enabled_flag, and the TMVP flag is the flag ph_temporal_mvp_enabled_flag. Thus, the maximum number MaxNumSubblockMergeCand may be derived as follows:

MaxNumSubblockMergeCand=(sps_five_
        minus_max_num_subblock_merge_cand==5
        && sps_sbtmvp_enabled_flag)?ph_tempo-
        ral_mvp_enabled_flag:(5−sps_five_minus_
        max_num_subblock_merge_cand)

The maximum numbers for different conditions may be as shown in Table 1 when the decoder module 124 uses the first equation and the second equation to determine the maximum number.

TABLE 1

| Condition | 1 | 2 | 3 | 4 | 5 | 6 |
|---|---|---|---|---|---|---|
| prediction mode enabled flag (sps_stmvp_enabled_flag) | 0 | 0 | 1 | 1 | 1 | 1 |
| TMVP flag (ph_temporal_mvp_enabled_flag) | 0 | 1 | 0 | 0 | 1 | 1 |
| Maximum index (sps_five_minus_max_num_subblock_merge_cand) | 0~5 | 0~5 | 0~4 | 5 | 0~5 | 5 |
| Maximum Number (MaxNumSubblockMergeCand) | 0~5 | 0~5 | 1~5 | 0 | 1~5 | 1 |

When the maximum index is equal to N, the prediction mode enabled flag is true and the TMVP flag is true, a third equation may be selected to determine that the maximum number is equal to (prediction mode enabled flag && TMVP flag). In addition, when the maximum index is different from N, the prediction mode enabled flag is false or TMVP flag is false, a fourth equation may be selected to determine that the maximum number is calculated by subtracting the maximum index from the number N. In other words, the maximum number MaxNumSubblockMergeCand may be derived as follows:

MaxNumSubblockMergeCand=(maximum
        index==N&& prediction mode enabled flag &&
        TMVP flag)?(prediction mode enabled flag &&
        TMVP flag):(N−maximum index)

For example, the maximum index is the index sps_five_minus_max_num_subblock_merge_cand when the number N is equal to five, the prediction mode enabled flag is the flag sps_sbtmvp_enabled_flag, and the TMVP flag is the flag ph_temporal_mvp_enabled_flag. Thus, the maximum number MaxNumSubblockMergeCand may be derived as follows:

MaxNumSubblockMergeCand=(sps_five_
        minus_max_num_subblock_merge_cand==5
        && sps_sbtmvp_enabled_flag && ph_tempo-
        ral_mvp_enabled_flag)?(sps_sbtmvp_
        enabled_flag && ph_temporal_mvp_
        enabled_flag):(5−sps_five_minus_max_
        num_subblock_merge_cand)

The maximum numbers for different conditions may be as shown in Table 2 when the decoder module 124 uses the third equation and the fourth equation to determine the maximum number.

TABLE 2

| Condition | 1 | 2 | 3 | 4 | 5 |
|---|---|---|---|---|---|
| prediction mode enabled flag (sps_stmvp_enabled_flag) | 0 | 0 | 1 | 1 | 1 |
| TMVP flag (ph_temporal_mvp_enabled_flag) | 0 | 1 | 0 | 1 | 1 |
| Maximum index (sps_five_minus_max_num_subblock_merge_cand) | 0~5 | 0~5 | 0~5 | 0~4 | 5 |
| Maximum Number (MaxNumSubblockMergeCand) | 0~5 | 0~5 | 0~5 | 1~5 | 1 |

According to Table 1 and Table 2, the maximum numbers calculated for different conditions by the first equation and the second equation are identical to the maximum numbers calculated for different conditions by the third equation and the fourth equation although a first equation set including the first equation and the second equation is different from a second equation set including the third equation and the fourth equation.

With reference to blocks 430-460 in FIG. 4, the maximum number MaxNumSubblockMergeCand may be derived as follows:

```
if( sps_affine_enabled_flag )
    MaxNumSubblockMergeCand
    = ( sps_five_minus_max_num_subblock_merge_cand = = 5 &&
        sps_sbtmvp_enabled_flag && ph_temporal_mvp_enabled_flag) ?
        (sps_sbtmvp_enabled_flag && ph_temporal_mvp_enabled_flag) :
        ( 5 − sps_five_minus_max_num_subblock_merge_cand )
else
    MaxNumSubblockMergeCand
    = sps_sbtmvp_enabled_flag && ph_temporal_mvp_enabled_flag
```

With respect to the operators for deriving the maximum number MaxNumSubblockMergeCand, the following definitions of the operators may be applied:

x && y Boolean logical "and" of x and y x?y:z If x is TRUE or not equal to 0, evaluates to the value of y; otherwise, evaluates to the value of z.

==Equal to

The decoder module 124 may determine whether the maximum number is included in the value range. The decoder module 124 may determine that the video data is not in compliance with the decoder module 124 when the decoder module 124 determines that the maximum number is not included in the value range.

Therefore, the decoder module 124 may output an error signal for the one or more image frames. In other words, the decoder module 124 may determine that the video data is in compliance with the decoder module 124 when the decoder module 124 determines that the maximum number is included in the value range. Therefore, the decoder module 124 may decode the bitstream to reconstruct the one or more image frames.

The decoder module 124 may determine whether the maximum index is included in the index range when the affine enabled flag is true. The decoder module 124 may determine that the video data is not in compliance with the decoder module 124 when the decoder module 124 determines that the maximum index is not included in the index range. Therefore, the decoder module 124 may output an error signal for the one or more image frames.

The above determination may be one of the bitstream conformance requirements in a video coding standard, such as versatile video coding (VVC). In other words, the decoder module 124 may determine that the video data is in compliance with the decoder module 124 when the decoder module 124 determines that the maximum index is included in the index range. Therefore, the decoder module 124 may decode the bitstream to reconstruct the one or more image frames.

At block 470, the decoder module 124 reconstructs the one or more image frames based on the maximum number of the zero or more subblock-based merging MVP candidates. With further reference to FIG. 1 and FIG. 2, the decoder module 124 may select a prediction mode for each of a plurality of image blocks in the one or more image frames from a plurality of mode candidates including the zero or more subblock-based merging MVP candidates and determine a plurality of predicted blocks based on the prediction modes. The number of the zero or more subblock-based merging MVP candidates for each image block in the one or more image frames is restricted by the maximum number. Therefore, the decoder module 124 reconstructs the one or more image frames based on the zero or more subblock-based merging MVP candidates restricted by the maximum number.

The zero or more subblock-based merging MVP candidates may include zero or more of a plurality of sbTMVP candidates, a plurality of affine merge prediction candidates and at least one zero-padding candidate. The decoder module 124 may determine a plurality of residual components from the bitstream for each of the image blocks and add the residual components into a corresponding one of the predicted blocks to reconstruct the image blocks. The decoder module 222 may reconstruct all of the image frames for reconstructing the video images.

In a video coding standard, such as high efficiency video coding (HEVC) and VVC, a plurality of first search candidates of the subblock-based merging mode including the subblock-based merging MVP candidates may be more efficient than a plurality of second search candidates of the affine AMVP prediction. However, the number of the first search candidates of the subblock-based merging mode may be restricted by the maximum number MaxNumSubblockMergeCand.

Therefore, due to an encoder complexity, the maximum number MaxNumSubblockMergeCand may be set to ensure that the subblock-based merging mode may not be disabled by the maximum number when the affine enabled flag, the sbTMVP enabled flag and the TMVP enabled flag are true. Therefore, the maximum number MaxNumSubblockMergeCand will be greater than one to enable the subblock-based merging mode when the affine enabled flag, the sbTMVP enabled flag and the TMVP enabled flag are equal to one.

Figure 5:
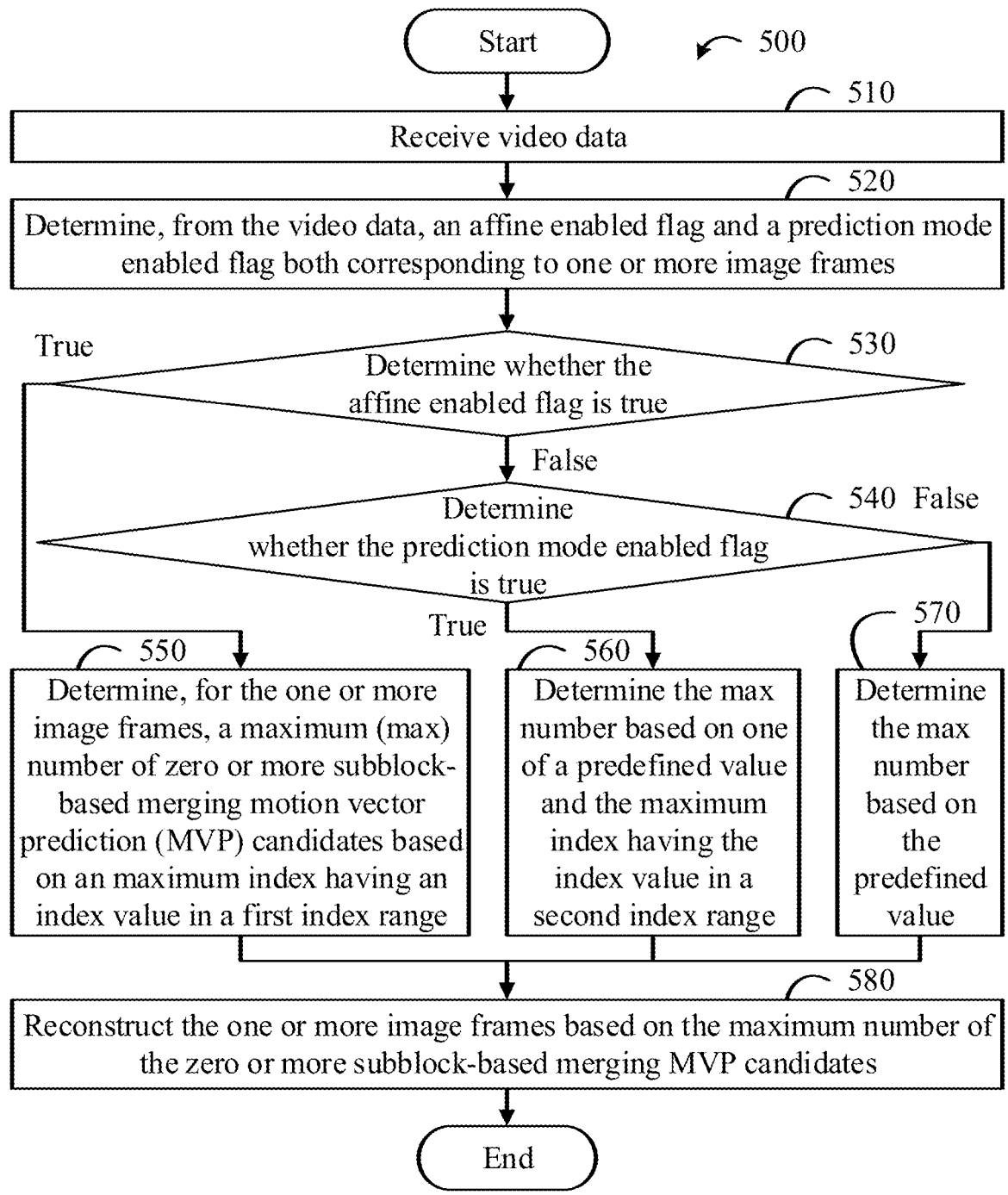
FIG. 5 illustrates a flowchart of a method for decoding video data by an electronic device according to an implementation of the present disclosure.

FIG. 5 illustrates a flowchart of a method 500 for decoding video data by an electronic device according to an implementation of the present disclosure. The method 500 is an example only as there are a variety of ways to perform decoding of the video data.

The method 500 may be performed using the configurations illustrated in FIG. 1 and FIG. 2 and various elements of these figures are referenced with regard to the method 500. Each block illustrated in FIG. 5 may represent one or more processes, methods, or subroutines performed.

The order of blocks in FIG. 5 is illustrative only and may change. Additional blocks may be added or less blocks may be utilized without departing from the present disclosure.

At block 510, the decoder module 124 receives video data. The video data may be a bitstream. With reference to FIG. 1 and FIG. 2, the second electronic device 120 may receive the bitstream from an encoder, such as the first electronic device 110, or other video providers via the second interface 126. The second interface 126 may provide the bitstream to the decoder module 124.

The entropy decoding unit 2241 may decode the bitstream to determine a plurality of prediction indications and a plurality of partitioning indications for a plurality of video images. Then, the decoder module 124 may further reconstruct the plurality of video images based on the prediction indications and the partitioning indications. The prediction indications and the partitioning indications may include a plurality of flags and a plurality of indices.

At block 520, the decoder module 124 determines, from the video data, an affine enabled flag and a prediction mode enabled flag both corresponding to one or more image frames from the video data. With further reference to FIG. 1 and FIG. 2, the decoder module 124 may determine the one or more image frames from the bitstream and determine a first parameter set corresponding to the one or more image frames.

The first parameter set may include a plurality of first prediction indications and a plurality of first partitioning indications. The first parameter set may be one of a video parameter set (VPS), a sequence parameter set (SPS), a picture parameter set (PPS), and a picture header (PH). For example, the affine enabled flag may be a flag sps_affine_enabled_flag when the affine enabled flag is included in the SPS. Each of the one or more image frames is reconstructed based on the SPS when the first parameter set is SPS.

The decoder module 124 may determine the affine enabled flag corresponding to the one or more image frames from the first parameter set of the bitstream. The affine enabled flag is used to determine whether an affine model-based motion compensation is enabled for the one or more image frames.

The decoder module 124 may further determine the prediction mode enabled flag corresponding to the one or more image frames from the first parameter set of the bitstream. The prediction mode enabled flag corresponding to a first one of a plurality of prediction modes may be used to determine whether the first prediction mode are enabled for the one or more image frames. The first prediction mode may be a subblock-based temporal motion vector prediction (MVP) (sbTMVP) mode.

Therefore, the prediction mode enabled flag may be an sbTMVP enabled flag. The sbTMVP enabled flag may be used to determine whether the sbTMVP mode having a plurality of subblock-based temporal motion vector predictors is enabled in the one or more image frames. The sbTMVP enabled flag may be a flag sps_sbtmvp_enabled_flag included in the SPS when the affine enabled flag is included in the SPS.

The decoder module 124 may further determine a maximum index corresponding to the one or more image frames from the first parameter set of the bitstream. The maximum index corresponding to a second one of the plurality of prediction modes may be used in the one or more image frames for calculating a maximum number of zero or more of prediction candidates corresponding to the second prediction mode. The second prediction mode may be a subblock-based merge MVP mode. Therefore, the maximum index may be an index sps_N_minus_max_num_subblock_merge_cand included in the SPS when the affine enabled flag is included in the SPS. The number N is a first integer. The maximum index is an index sps_five_minus_max_num_subblock_merge_cand when the maximum index is included in the SPS and the number N is equal to 5. The subblock-based merge MVP mode may include zero or more subblock-based merging MVP candidates having zero or more of a plurality of sbTMVP candidates, a plurality of affine merge prediction candidates and at least one zero-padding candidate.

At block 530, the decoder module 124 determines whether the affine enabled flag is true. The method 500 may proceed to block 540 when the decoder module 124 determines that the affine enabled flag is false. The method 500 may proceed to block 550 when the decoder module 124 determines the affine enabled flag is true.

The decoder module 124 determines that the affine enabled flag is true when the affine enabled flag is equal to one. The decoder module 124 determines that the affine enabled flag is false when the affine enabled flag is equal to zero.

The affine enabled flag is a flag vps_affine_enabled_flag when the affine enabled flag is included in VPS. The affine enabled flag is a flag sps_affine_enabled_flag when the affine enabled flag is included in an SPS. The affine enabled flag is a flag pps_affine_enabled_flag when the affine enabled flag is included in a PPS. The affine enabled flag is a flag ph_affine_enabled_flag when the affine enabled flag is included in a PH.

At block 540, the decoder module 124 determines whether the prediction mode enabled flag is true. The method 500 may proceed to block 560 when the decoder module 124 determines that the prediction mode enabled flag is true. The method 500 may proceed to block 570 when the decoder module 124 determines the prediction mode enabled flag is false.

The decoder module 124 determines that the prediction mode enabled flag is true when the prediction mode enabled flag is equal to one. The decoder module 124 determines that the prediction mode enabled flag is false when the prediction mode enabled flag is equal to zero.

The prediction mode enabled flag is a flag vps_sbtmvp_enabled_flag when the affine enabled flag and the prediction mode enabled flag are included in VPS. The prediction mode enabled flag is a flag sps_sbtmvp_enabled_flag when the affine enabled flag and the prediction mode enabled flag are included in an SPS. The affine enabled flag is a flag pps_sbtmvp_enabled_flag when the affine enabled flag and the prediction mode enabled flag are included in a PPS. The prediction mode enabled flag is a flag ph_sbtmvp_enabled_flag when the affine enabled flag and the prediction mode enabled flag are included in a PH.

At block 550, the decoder module 124 determines, for the one or more image frames, the maximum number of the zero or more subblock-based merging MVP candidates based on the maximum index having an index value in a first index range. With further reference to FIG. 1 and FIG. 2, the decoder module 124 determines that the index value of the maximum index is in the first index range when the affine enabled flag is true.

The first index range may be predefined from P to N−K1. The number P is a second integer less than the number N, and the number K1 is a third integer less than the number N. The numbers P and K1 may be predefined in the first electronic device 110 and the second electronic device 120. When the maximum index is an index sps_five_minus_max_num_subblock_merge_cand, the first index range may be predefined from P to 5−K1.

Therefore, the first index range may be predefined from 0 to 5 when the numbers P and K1 are equal to zero. In addition, the first index range may be predefined from 0 to 4 when the number P is equal to zero and the number K1 is equal to one.

The first index range may be predefined from P to N−K2. A value of the variable K2 may be equal to a fourth integer less than the number N. The number P may be predefined in the first electronic device 110 and the second electronic device 120, and the value of the variable K2 may be determined from the bitstream.

When the maximum index is an index sps_five_minus_max_num_subblock_merge_cand, the first index range may be predefined from P to 5−K2. Therefore, the first index range may be predefined from 0 to 5−K2 when the numbers P is equal to zero.

The variable K2 may be determined by a flag included in the first parameter set of the bitstream. Therefore, the flag for determining the variable K2 is also included in the SPS when the affine enabled flag and the maximum index are included in the SPS. The flag for determining the variable K2 may be the prediction mode enabled flag. Therefore, the first index range may be determined based on the prediction mode enabled flag.

For example, when the number P is equal to zero and the variable K2 is equal to a flag value of the prediction mode enabled flag, the index value of the maximum index is in the first index range of 0 to N−K2. The index value of the maximum index is in the first index range of 0 to N−1 when the prediction mode enabled flag is equal to one. The index value of the maximum index is in the index range of 0 to N when the prediction mode enabled flag is equal to zero. The number N may be equal to five.

The prediction mode enabled flag may be the sbTMVP enabled flag included in the SPS. Therefore, the first index range of the index sps_five_minus_max_num_subblock_merge_cand may be predefined from 0 to 4 when the number P is equal to zero and the sbTMVP enabled flag is equal to one. In addition, the first index range of the index sps_five_minus_max_num_subblock_merge_cand may be predefined from 0 to 5 when the number P is equal to zero and the sbTMVP enabled flag is equal to zero.

The maximum number may be calculated by subtracting the maximum index from the number N, when the affine enabled flag is true. Therefore, the maximum number may be calculated by subtracting the maximum index from five, when the affine enabled flag is true and the number N is equal to 5. In other words, when the affine enabled flag is true and the number N is equal to 5, the maximum number MaxNumSubblockMergeCand may be derived as follows:

MaxNumSubblockMergeCand=5−sps_five_minus_max_num_subblock_merge_cand

The index value of the maximum index may be in the first index range of P to N−K1 and the maximum number may be calculated by subtracting the maximum index from the number N, when the affine enabled flag is true. Therefore, a value of the maximum number is in a value range of K1 to N−P. When the maximum index is the index sps_five_minus_max_num_subblock_merge_cand, the first index range may be predefined from P to 5−K1 and the value range may be predefined from K1 to 5−P.

Therefore, both the first index range and the value range may be predefined from 0 to 5 when the numbers P and K1 are equal to zero. In addition, the first index range may be predefined from 0 to 4 and the value range may be predefined from 1 to 5 when the number P is equal to zero and the number K1 is equal to one.

The index value of the maximum index may be in the first index range of P to N−K2 and the maximum number may be calculated by subtracting the maximum index from the number N, when the affine enabled flag is true. Therefore, the value of the maximum number is in the value range of K2 to N−P. When the maximum index is the index sps_five_minus_max_num_subblock_merge_cand and the variable K2 is the flag sps_sbtmvp_enabled_flag, the first index range may be predefined from P to 5−sps_sbtmvp_enabled_flag and the value range may be predefined from sps_sbtmvp_enabled_flag to 5−P.

Therefore, both the first index range and the value range may be predefined from 0 to 5 when the number P and the flag sps_sbtmvp_enabled_flag are equal to zero. In addition, the first index range may be predefined from 0 to 4 and the value range may be predefined from 1 to 5 when the number P is equal to zero and the flag sps_sbtmvp_enabled_flag is equal to one.

At block 560, the decoder module 124 determines the maximum number based on one of a predefined value and the maximum index having the index value in a second index range. With further reference to FIG. 1 and FIG. 2, the decoder module 124 determines, for the one or more image frames, the maximum number of the zero or more subblock-based merging MVP candidates based on one of the predefined value and the maximum index having the index value in the second index range when the affine enabled flag is false and the prediction mode enabled flag is true.

When the affine enabled flag is false and both the prediction mode enabled flag and the TMVP flag are true, the decoder module 124 determines, for the one or more image frames, the maximum number based on the maximum index having the index value in the second index range. When the affine enabled flag is false, the prediction mode enabled flag is true and the TMVP flag is false, the decoder module 124 determines, for the one or more image frames, the maximum number based on the predefined value.

The predefined value may be predefined to be equal to zero in the first electronic device 110 and the second electronic device 120. Therefore, when the affine enabled flag is false, the prediction mode enabled flag is true and the TMVP flag is false, the decoder module 124 determines that the maximum number is equal to zero.

The second index range may be predefined from Q to N−R. The number Q is a fifth integer less than the number N, and the number R is a sixth integer less than the number N. The numbers Q and R may be predefined in the first electronic device 110 and the second electronic device 120. When the maximum index is the index sps_five_minus_max_num_subblock_merge_cand, the second index range may be predefined from Q to 5−R.

Therefore, the second index range may be predefined from 4 to 5 when the number Q is equal to four and the number R is equal to zero. In addition, the maximum index may be predefined to be equal to four when the number Q is equal to four and the number R is equal to one. The maximum index may be equal to a first predefined index value being equal to the number Q when a sum of the numbers Q and R is equal to the number N.

The maximum number may be calculated by subtracting the maximum index from the number N, when the affine enabled flag is false, the prediction mode enabled flag is true and the TMVP flag is true. The maximum number may be calculated by subtracting the maximum index from five, when the number N is equal to 5.

The index value of the maximum index may be in the second index range of Q to N−R and the maximum number may be calculated by subtracting the maximum index from the number N, when the affine enabled flag is false and both the prediction mode enabled flag and the TMVP flag are true. Therefore, a value of the maximum number is in the value range of R to N−Q. When the maximum index is the index sps_five_minus_max_num_subblock_merge_cand, the value range may be predefined from R to 5−Q. Therefore, the value range may be predefined from 0 to 1 when the number Q is equal to four and the number R is equal to zero.

In addition, the value of the maximum number may be predefined to be equal to 1 when the number Q is equal to four and the number R is equal to one. Therefore, the maximum number may be equal to a predefined number value being equal to N-Q when the sum of the numbers Q and R is equal to the number N.

When the affine enabled flag is false and both the prediction mode enabled flag and the TMVP flag are true, the maximum number may be equal to or slightly greater than zero. For example, the maximum number is equal to zero or one. Therefore, when the affine enabled flag is false and both the prediction mode enabled flag and the TMVP flag are true, the maximum index may be equal to or slightly less than the number N.

For example, if the maximum index is equal to five or four, the encoder module 114 may need to use more bits to signal the maximum index and the decoder module 124 need to parse more bits to determine the maximum index. In order to reduce number of bits of the maximum index, the encoder module 114 may further adjust the maximum index by subtracting the number Q from the maximum index before the encoder module 114 signals the maximum index.

Therefore, the index value of the adjusted maximum index is in a third index range of 0 to N–R–Q, when the affine enabled flag is false and both the prediction mode enabled flag and the TMVP flag are true. The decoder module 124 may determine the original maximum index by adding the number Q into the adjusted maximum index before the decoder module 124 determines the maximum number based on the maximum index when the affine enabled flag is false and both the prediction mode enabled flag and the TMVP flag are true. For example, the decoder module 124 may further parse the adjusted maximum index being in the third index range of 0 to 1 when the number N is equal to five, the number Q is equal to four and the number R is equal to zero.

At block 570, the decoder module 124 determines the maximum number based on the predefined value. With further reference to FIG. 1 and FIG. 2, the decoder module 124 determines, for the one or more image frames, the maximum number of the zero or more subblock-based merging MVP candidates based on the predefined value when both the affine enabled flag and the prediction mode enabled flag are false.

When both the affine enabled flag and the prediction mode enabled flag are false, the decoder module 124 determines, for the one or more image frames, the maximum number based on the predefined value. The predefined value may be equal to zero in the first electronic device 110 and the second electronic device 120. Therefore, when both the affine enabled flag and the prediction mode enabled flag are false, the decoder module 124 determines that the maximum number is equal to zero.

With reference to blocks 530-570 in FIG. 5, the maximum number MaxNumSubblockMergeCand may be derived as follows:

```
if( sps_affine_enabled_flag)
    MaxNumSubblockMergeCand = 5 – maximum index
else
    MaxNumSubblockMergeCand
    = (prediction mode enabled flag && TMVP flag ) ?
    (N – maximum index) : 0
```

For example, the maximum index is the index sps_five_minus_max_num_subblock_merge_cand when the number N is equal to five, the prediction mode enabled flag is the flag sps_sbtmvp_enabled_flag, and the TMVP flag is the flag ph_temporal_mvp_enabled_flag. Thus, the maximum number MaxNumSubblockMergeCand may be derived as follows:

```
MaxNumSubblockMergeCand=(sps_affine_
    enabled_flag||sps_sbtmvp_enabled_flag &&
    ph_temporal_mvp_enabled_flag)?(5–sps_
    five_minus_max_num_subblock_merge_cand):0
```

With reference to block 550, the maximum index may be determined from the first parameter set when the affine enabled flag is true. With reference to block 560, the maximum index may be determined from the first parameter set when the affine enabled flag is false. Therefore, the value of the affine enabled flag may not be used to determine whether the maximum index is included in the first parameter set.

The decoder module 124 may determine, at block 520, the maximum index from the first parameter set before the decoder module 124 determines, at block 530, whether the affine enabled flag is true. The maximum number equal to the predefined value is unrelated to the maximum index, when the affine enabled flag is false and one of the prediction mode enabled flag and the TMVP flag are also false.

Therefore, the maximum index determined at block 520 may be predefined to be equal to a second predefined index value when the affine enabled flag is false and one of the prediction mode enabled flag and the TMVP flag is also false. The second predefined index value may be equal to zero or five.

With reference to blocks 560 and 570, the maximum number is unrelated to the maximum index when the affine enabled flag is false and one of the prediction mode enabled flag and the TMVP flag is also false. Therefore, the decoder module 124 may determine, based on the affine enabled flag, the prediction mode enabled flag and the TMVP flag, whether the maximum index is included in the first parameter set.

For example, the decoder module 124 may determine, at block 550, the maximum index from the first parameter set of the bitstream when the affine enabled flag is true. In addition, the decoder module 124 may determine, at block 560, the maximum index from the first parameter set of the bitstream when the affine enabled flag is false and both the prediction mode enabled flag and the TMVP flag are true. Furthermore, the maximum index may not be included in the first parameter set of the bitstream when the affine enabled flag is false and one of the prediction mode enabled flag and the TMVP flag is false. When the maximum index is not present in the first parameter set for calculating the maximum number, the maximum index may be inferred to be equal to the second predefined index value, such as zero and five.

The numbers P, K1 and R may be equal to zero and the number Q may be equal to four. Therefore, when the affine enabled flag is true, the index value of the maximum index may be in the index range of zero to five. In addition, when the affine enabled flag is false and the prediction mode enabled flag is true, the index value of the maximum index may be in the index range of four to five. The maximum numbers for different conditions may be as shown in Table 3, when the numbers P, K1 and R may be equal to zero and the number Q may be equal to four.

TABLE 3

| Condition | 1 | 2 | 3 | 4 |
|---|---|---|---|---|
| affine enabled flag (sps_affine_enabled_flag) | 0 | 0 | 0 | 1 |
| prediction mode enabled flag (sps_tmvp_enabled_flag) | 0 | 1 | 1 | 0~1 |
| TMVP flag (ph_temporal_mvp_enabled_flag) | 0~1 | 0 | 1 | 0~1 |
| Maximum index (sps_five_minus_max_num_subblock_merge_cand) | 2nd predefined index value | 2nd predefined index value | 4~5 | 0~5 |
| Maximum Number (MaxNumSubblockMergeCand) | 0 | 0 | 0~1 | 0~5 |

At block 580, the decoder module 124 reconstructs the one or more image frames based on the maximum number of the zero or more subblock-based merging MVP candidates. With further reference to FIG. 1 and FIG. 2, the decoder module 124 may select a prediction mode for each of a plurality of image blocks in the one or more image frames from a plurality of mode candidates including the zero or more subblock-based merging MVP candidates and determine a plurality of predicted blocks based on the prediction modes. The number of the zero or more subblock-based merging MVP candidates for each image block in the one or more image frames is restricted by the maximum number. Therefore, the decoder module 124 reconstructs the one or more image frames based on the zero or more subblock-based merging MVP candidates restricted by the maximum number.

The zero or more subblock-based merging MVP candidates may include zero or more of a plurality of sbTMVP candidates, a plurality of affine merge prediction candidates and at least one zero-padding candidate. The decoder module 124 may determine a plurality of residual components from the bitstream for each of the image blocks and add the residual components into a corresponding one of the predicted blocks to reconstruct the image blocks. The decoder module 222 may reconstruct all of the image frames for reconstructing the video images.

In a video coding standard, such as high efficiency video coding (HEVC) and VVC, a plurality of first search candidates of the subblock-based merging mode including the subblock-based merging MVP candidates may be more efficient than a plurality of second search candidates of the affine AMVP prediction. However, the number of the first search candidates of the subblock-based merging mode may be restricted by the maximum number MaxNumSubblockMergeCand.

Therefore, due to an encoder complexity, the maximum number MaxNumSubblockMergeCand may not be directly set as zero when the affine enabled flag is false. Therefore, the decoder module 124 may determine, based on the prediction mode enabled flag, the TMVP flag and the maximum index, the maximum number MaxNumSubblockMergeCand may be equal to one for adding the subblock-based merging mode into the candidate modes when the affine enabled flag is false.

In order to decrease complexity, the subblock-based merging mode may be used when the affine enabled flag is true. The value of the variable K2 determined from the sbTMVP enabled flag may be equal to one for changing the value range of the maximum number MaxNumSubblockMergeCand when the affine enabled flag is true. However, it is unnecessary to reserve a candidate for the subblock-based merging MVP candidates when the subblock-based merging mode has been already disabled. Therefore, the value of the variable K2 determined from the sbTMVP enabled flag may be equal to zero to maintain the value range unchanged when the subblock-based merging mode is disabled.

Figure 6:
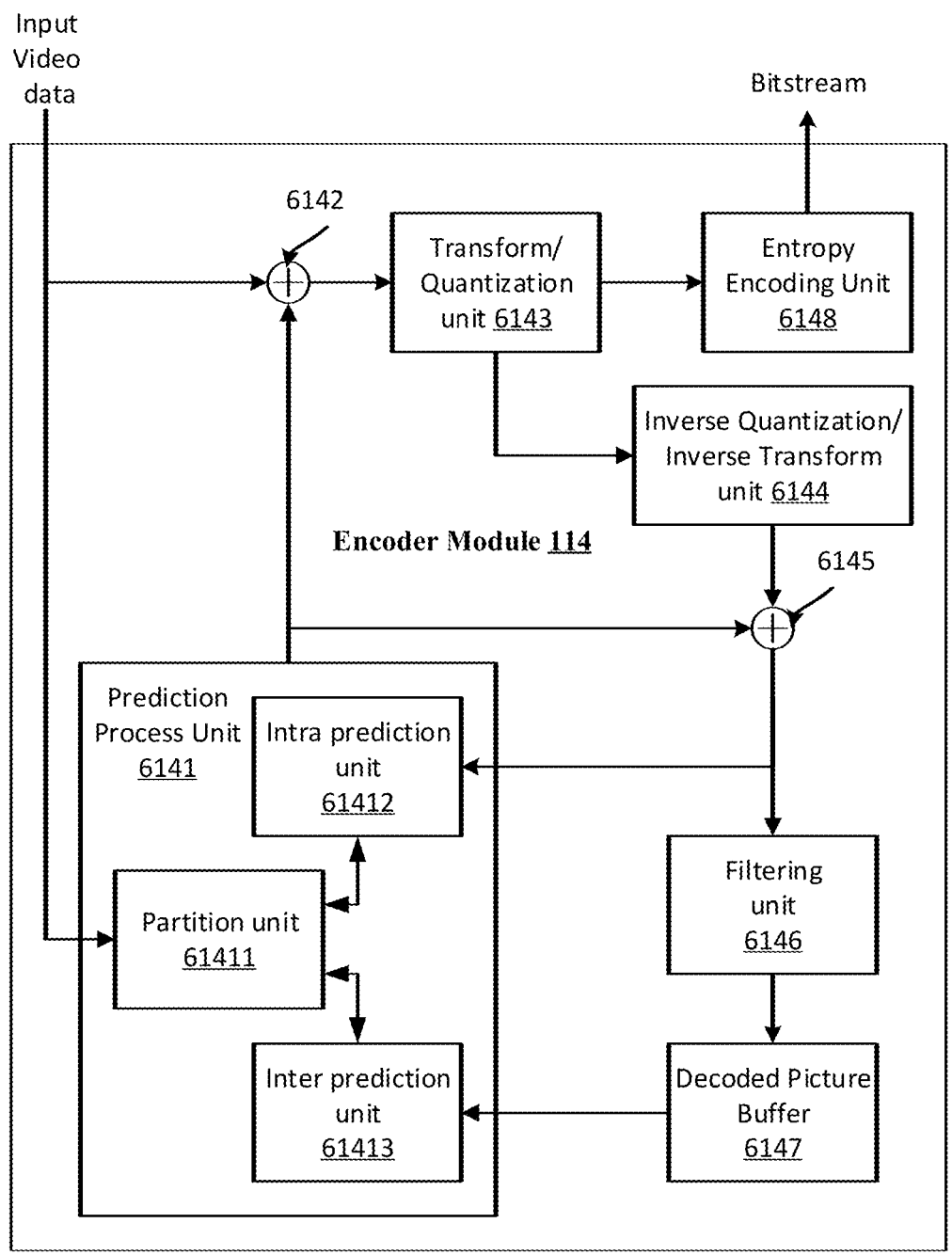
FIG. 6 illustrates a block diagram of the encoder module of the first electronic device illustrated in FIG. 1 according to an implementation of the present disclosure.

FIG. 6 illustrates a block diagram of the encoder module 114 of the first electronic device 110 illustrated in FIG. 1 according to an implementation of the present disclosure. The encoder module 114 may include a prediction processor (e.g., prediction process unit 6141), at least a first summer (e.g., first summer 6142) and a second summer (e.g., second summer 6145), a transform/quantization processor (e.g., transform/quantization unit 6143), an inverse quantization/inverse transform processor (e.g., inverse quantization/inverse transform unit 6144), a filter (e.g., filtering unit 6146), a decoded picture buffer (e.g., decoded picture buffer 6147), and an entropy encoder (e.g., entropy encoding unit 6148). The prediction process unit 6141 of the encoder module 114 may further include a partition processor (e.g., partition unit 61411), an intra prediction processor (e.g., intra prediction unit 61412), and an inter prediction processor (e.g., inter prediction unit 61413).

The encoder module 114 may receive the source video and encode the source video to output a bitstream. The encoder module 114 may receive source video including a plurality of image frames and then divide the image frames according to a coding structure. Each of the image frames may be divided into at least one image block.

The at least one image block may include a luminance block having a plurality of luminance samples and at least one chrominance block having a plurality of chrominance samples. The luminance block and the at least one chrominance block may be further divided to generate macroblocks, coding tree units (CTUs), coding blocks (CBs), subdivisions thereof, and/or another equivalent coding unit.

The encoder module 114 may perform additional subdivisions of the source video. It should be noted that the disclosed implementations are generally applicable to video coding regardless of how the source video is partitioned prior to and/or during the encoding.

During the encoding process, the prediction process unit 6141 may receive a current image block of a specific one of the image frames. The current image block may be the luminance block or one of the chrominance blocks in the specific image frame.

The partition unit 61411 may divide the current image block into multiple block units. The intra prediction unit 61412 may perform intra-predictive coding of a current block unit relative to one or more neighboring blocks in the same frame as the current block unit in order to provide spatial prediction. The inter prediction unit 61413 may perform inter-predictive coding of the current block unit relative to one or more blocks in one or more reference image blocks to provide temporal prediction.

The prediction process unit 6141 may select one of the coding results generated by the intra prediction unit 61412 and the inter prediction unit 61413 based on a mode selection method, such as a cost function. The mode selection method may be a rate-distortion optimization (RDO) process.

The prediction process unit 6141 may determine the selected coding result and provide a predicted block corresponding to the selected coding result to the first summer 6142 for generating a residual block and to the second summer 6145 for reconstructing the encoded block unit. The prediction process unit 6141 may further provide syntax elements such as motion vectors, intra mode indicators, partition information, and other syntax information to the entropy encoding unit 6148.

The intra prediction unit 61412 may intra predict the current block unit. The intra prediction unit 61412 may determine an intra prediction mode directed toward a reconstructed sample neighboring the current block unit in order to encode the current block unit.

The intra prediction unit 61412 may encode the current block unit using various intra prediction modes. The intra prediction unit 61412 or the prediction process unit 6141 may select an appropriate intra prediction mode from the selected modes. The intra prediction unit 61412 may encode the current block unit using a cross component prediction mode to predict one of the two chroma components of the current block unit based on the luma components of the current block unit. The intra prediction unit 61412 may predict a first one of the two chroma components of the current block unit based on the second of the two chroma components of the current block unit.

The inter prediction unit 61413 may inter predict the current block unit as an alternative to the intra prediction performed by the intra prediction unit 61412. The inter prediction unit 61413 may perform motion estimation to estimate motion of the current block unit for generating a motion vector.

The motion vector may indicate a displacement of the current block unit within the current image block relative to a reference block unit within a reference image block. The inter prediction unit 61413 may receive at least one reference image block stored in the decoded picture buffer 6147 and estimate the motion based on the received reference image blocks to generate the motion vector.

The first summer 6142 may generate the residual block by subtracting the prediction block determined by the prediction process unit 6141 from the original current block unit. The first summer 6142 may represent the component or components that perform this subtraction.

The transform/quantization unit 6143 may apply a transform to the residual block in order to generate a residual transform coefficient and then quantize the residual transform coefficients to further reduce bit rate. The transform may be one of a DCT, DST, AMT, MDNSST, HyGT, signal dependent transform, KLT, wavelet transform, integer transform, sub-band transform or a conceptually similar transform.

The transform may convert the residual information from a pixel value domain to a transform domain, such as a frequency domain. The degree of quantization may be modified by adjusting a quantization parameter.

The transform/quantization unit 6143 may perform a scan of the matrix including the quantized transform coefficients. Alternatively, the entropy encoding unit 6148 may perform the scan.

The entropy encoding unit 6148 may receive a plurality of syntax elements from the prediction process unit 6141 and the transform/quantization unit 6143 including a quantization parameter, transform data, motion vectors, intra modes, partition information, and other syntax information. The entropy encoding unit 6148 may encode the syntax elements into the bitstream.

The entropy encoding unit 6148 may entropy encode the quantized transform coefficients by performing CAVLC, CABAC, SBAC, PIPE coding or another entropy coding technique to generate an encoded bitstream. The encoded bitstream may be transmitted to another device (i.e., the second electronic device 120 in FIG. 1) or archived for later transmission or retrieval.

The inverse quantization/inverse transform unit 6144 may apply inverse quantization and inverse transformation to reconstruct the residual block in the pixel domain for later use as a reference block. The second summer 6145 may add the reconstructed residual block to the prediction block provided from the prediction process unit 6141 in order to produce a reconstructed block for storage in the decoded picture buffer 6147.

The filtering unit 6146 may include a deblocking filter, a SAO filter, a bilateral filter, and/or an ALF to remove blocking artifacts from the reconstructed block. Additional filters (in loop or post loop) may be used in addition to the deblocking filter, the SAO filter, the bilateral filter and the ALF. Such filters are not illustrated for brevity and may filter the output of the second summer 6145.

The decoded picture buffer 6147 may be a reference picture memory that stores the reference block for use by the encoder module 114 to encode video, such as in intra or inter coding modes. The decoded picture buffer 6147 may include a variety of memory devices such as DRAM, including SDRAM, MRAM, RRAM), or other types of memory devices. The decoded picture buffer 6147 may be on-chip with other components of the encoder module 114 or off-chip relative to those components.

The encoder module 114 may receive video data and use a plurality of prediction modes to predict a plurality of image frames in the video data. The prediction modes may include a plurality of merge modes having a plurality of merging candidates. The encoder module 114 may signal, based on the prediction results, an affine enabled flag in FIGS. 3-5 for determining whether the affine mode is enabled for one or more image frames.

The encoder module 114 may signal, based on the prediction results, a maximum index for the method 300-500 in FIGS. 3-5 for determining a corresponding maximum number. In addition, with reference to FIGS. 3-5, the encoder module 114 may signal a subblock-based temporal MVP enabled flag and a temporal MVP flag for determining the maximum number of the affine merging MVP candidates. Then, the encoder module 114 may add the encoded data including the flags and the indices into the bitstream for providing to the decoder module 124.

The disclosed implementations are to be considered in all respects as illustrative and not restrictive. It should also be understood that the present disclosure is not limited to the specific disclosed implementations but that many rearrangements, modifications, and substitutions are possible without departing from the scope of the present disclosure.

What is claimed is:

1. A method of decoding a bitstream by an electronic device, the method comprising:
    receiving the bitstream;
    determining, from the bitstream, a prediction mode enabled flag and an affine enabled flag both corresponding to one or more image frames;
    determining, from the bitstream, a maximum index corresponding to the one or more image frames when the affine enabled flag is true, wherein an index value of the maximum index is in an index range determined based on the prediction mode enabled flag;
    determining a maximum number of zero or more subblock-based merging motion vector prediction (MVP) candidates based on the maximum index when the affine enabled flag is true;
    determining the maximum number based on the prediction mode enabled flag and a temporal MVP flag without determining the maximum index from the bitstream when the affine enabled flag is false; and
    reconstructing the one or more image frames based on the maximum number of the zero or more subblock-based merging MVP candidates.

2. The method according to claim 1, wherein the index value of the maximum index is in an index range of 0 to N-K, N being an integer and K being equal to the prediction mode enabled flag and less than N.

3. The method according to claim 2, wherein N is equal to five.

4. The method according to claim 2, wherein:
    the maximum number is determined by subtracting the index value of the maximum index from N, and
    the maximum number is in a value range of the prediction mode enabled flag to N.

5. The method according to claim 2, wherein:
the index value of the maximum index is in the index range of 0 to N-1 and the maximum number is in a value range of 1 to N when the prediction mode enabled flag is equal to 1, and
the index value of the maximum index is in the index range of 0 to N and the maximum number is in a value range of 0 to N when the prediction mode enabled flag is equal to 0.

6. The method according to claim 1, wherein:
the prediction mode enabled flag is included in a sequence parameter set (SPS) of the bitstream, and
each of the one or more image frames is reconstructed based on the SPS.

7. The method according to claim 6, wherein the affine enabled flag and the maximum index are included in the SPS.

8. The method according to claim 1, wherein the prediction mode enabled flag is a subblock-based temporal MVP enabled flag indicating whether a subblock-based temporal MVP mode is enabled in the one or more image frames.

9. The method according to claim 1, wherein:
the temporal MVP flag is included in a picture header corresponding to at least one of the one or more image frames and included in the bitstream, and
the at least one of the one or more image frames is reconstructed based on the picture header.

10. An electronic device for decoding a bitstream, the electronic device comprising:
at least one processor; and
a storage device coupled to the at least one processor and storing a plurality of instructions which, when executed by the at least one processor, causes the at least one processor to:
receive the bitstream;
determine, from the bitstream, a prediction mode enabled flag and an affine enabled flag both corresponding to one or more image frames;
determine, from the bitstream, a maximum index corresponding to the one or more image frames when the affine enabled flag is true, wherein an index value of the maximum index is in an index range determined based on the prediction mode enabled flag;
determine a maximum number of zero or more subblock-based merging motion vector prediction (MVP) candidates based on the maximum index when the affine enabled flag is true;
determine the maximum number based on the prediction mode enabled flag and a temporal MVP flag without determining the maximum index from the bitstream when the affine enabled flag is false; and
reconstruct the one or more image frames based on the maximum number of the zero or more subblock-based merging MVP candidates.

11. The electronic device according to claim 10, wherein the index value of the maximum index is in an index range of 0 to N-K, N being an integer and K being equal to the prediction mode enabled flag and less than N.

12. The electronic device according to claim 11, wherein:
the maximum number is determined by subtracting the index value of the maximum index from N, and
the maximum number is in a value range of the prediction mode enabled flag to N.

13. The electronic device according to claim 10, wherein:
the prediction mode enabled flag is included in a sequence parameter set (SPS) of the bitstream, and
each of the one or more image frames is reconstructed based on the SPS.

14. The electronic device according to claim 10, wherein the prediction mode enabled flag is a subblock-based temporal MVP enabled flag indicating whether a subblock-based temporal MVP mode is enabled in the one or more image frames.

15. The electronic device according to claim 10, wherein:
the temporal MVP flag is included in a picture header corresponding to at least one of the one or more image frames and included in the bitstream, and
the at least one of the one or more image frames is reconstructed based on the picture header.

16. A method of decoding a bitstream by an electronic device, the method comprising:
receiving the bitstream;
determining, from the bitstream, an affine enabled flag corresponding to one or more image frames;
determining, from the bitstream, a maximum index corresponding to the one or more image frames for a maximum number of zero or more subblock-based merging motion vector prediction (MVP) candidates when the affine enabled flag is true;
determining the maximum number of zero or more subblock-based merging MVP candidates based on a prediction mode enabled flag and a temporal MVP flag without determining the maximum index from the bitstream when the affine enabled flag is false; and
reconstructing the one or more image frames based on the maximum number of the zero or more subblock-based merging MVP candidates.

17. The method according to claim 16, wherein an index value of the maximum index is in an index range of 0 to N-K, N being an integer and K being equal to the prediction mode enabled flag and less than N.

18. The method according to claim 16, further comprising:
determining the maximum number by subtracting an index value of the maximum index from N when the affine enabled flag is true, wherein the maximum number is in a value range of the prediction mode enabled flag to N.

19. The method according to claim 16, wherein the prediction mode enabled flag is a subblock-based temporal MVP enabled flag indicating whether a subblock-based temporal MVP mode is enabled in the one or more image frames.

* * * * *